United States Patent [19]

Burk

[11] Patent Number: 4,993,170
[45] Date of Patent: Feb. 19, 1991

[54] HANDS-OFF MICROMETER

[75] Inventor: David L. Burk, Pittsburgh, Pa.

[73] Assignee: Allegheny Ludlum Corporation, Pittsburgh, Pa.

[21] Appl. No.: 499,110

[22] Filed: Mar. 26, 1990

[51] Int. Cl.⁵ .............................................. G01B 5/00
[52] U.S. Cl. ..................................... 33/794; 33/784; 33/793
[58] Field of Search ................. 33/783, 784, 793, 794, 33/811, 501.05, 501.08, 501.6, 819, 820

[56] References Cited

U.S. PATENT DOCUMENTS

| | | | |
|---|---|---|---|
| 448,586 | 3/1891 | Plummer | 33/804 |
| 675,875 | 6/1901 | Ullmer | 33/501.4 |
| 1,531,357 | 3/1925 | Tautz | 33/794 |
| 2,833,046 | 5/1958 | Jeglum | 33/793 |
| 3,256,609 | 6/1966 | White | 33/501.2 |

Primary Examiner—Harry N. Haroian

Attorney, Agent, or Firm—Patrick J. Viccaro

[57] ABSTRACT

A novel micrometer apparatus is provided which is capable of providing strip workpiece thickness measurements with high precision and without operator dependence, the apparatus including a fixed anvil mounted to a "C" frame, a movable shaft mounted opposite the fixed anvil at a separation distance from the fixed anvil which represents the thickness of material therebetween, the fixed anvil being held in position by the full weight of the apparatus and the center of gravity of the apparatus passes through the fixed anvil and solidly against the top surface of the essentially horizontal strip being measured, an indicator having a measuring head for carrying the movable shaft which contacts the bottom side of the strip opposite the fixed anvil, and a display head positioned atop the micrometer apparatus above the strip such that the thickness measurement is performed and displayed automatically while the apparatus sits unattended on the workpiece.

12 Claims, 2 Drawing Sheets

HANDS-OFF MICROMETER

BACKGROUND OF THE INVENTION

The present invention generally relates to micrometer devices, and, more particularly, to a portable micrometer device capable of providing extremely accurate sheet or strip workpiece thickness readings by virtue of self-contained, gravity assisted, automatic workpiece thickness measuring means and workpiece thickness indicating means cooperating to minimize human involvement in the operation of the micrometer device.

DESCRIPTION OF THE PRIOR ART

X-ray gagers are used in the art of workpiece treatment operations as means to measure the thickness of workpieces, such as metal or steel strip to determine if such workpieces are within acceptable commercial tolerance.

Because of the large spacing that is possible between the source and the detector and the continuous reading that they provide, x-ray gagers are, in most cases, the instrument of choice on rolling mills and other continuous operations such as anneal and pickle lines, slitters and cut-to-length lines.

X-ray gagers have one significant disadvantage, their output depends not only on the thickness of the steel, but on its composition as well. While the precise avoidance of the latter problem is important in all applications of an x-ray gager, it is particularly critical on a rolling mill where the x-ray signal is used to drive the automatic gage control system which creates the thickness required to meet the customer's specifications. A known method for calibrating x-ray gagers which avoids the composition differences which occur from one alloy to another and even from heat to heat within an alloy grade is referred to as the "Comparator" approach. In this method, the thickness of a particular spot of the strip is measured with a hand micrometer after the strip is threaded into the mill and is under tension. The x-ray gager is then placed over the same spot, and the hand micrometer reading is entered into the x-ray gager as the nominal gage of the steel to standardize the x-ray gager. Such operation causes the x-ray gager to then read the thickness of the strip material as would the hand micrometer.

The primary disadvantage with the comparator procedure is that it is not possible to obtain thickness readings from the hand micrometer, which are essential in the initial x-ray gager standardizing step, with the precision required to meet increasingly stringent gage tolerances.

In the aforesaid operation, a conventional hand micrometer is typically used at a location on the strip between the roll bite and the billy roll while the strip is stationary and under tension. This location is generally somewhat awkward to reach which makes it difficult or impossible to see the micrometer read-out scale while the micrometer is on the strip. Consequently, the micrometer barrel has to be "backed-off" from the proper thickness to permit removal of the micrometer from the strip so that the thickness reading may be obtained by the operator. Once removed, the barrel of the micrometer must be "turned back" to the "correct" position, which, of course, is merely a guess by the micrometer operator.

A related problem associated with the use of conventional hand micrometers is that quite commonly an individual errs in reading the engraved micrometer scale because three locations must be read and the last place must be visually interpolated to one-tenth of a mil (0.0001").

Clearly, strip thickness determination using a conventional hand micrometer is an imprecise and strongly operator-dependent procedure. Reproducibility and repeatability trials involving operators using hand micrometers to determine strip thickness indicate that over 50% of the available tolerance band is wasted by the uncertainty of the hand micrometer procedure.

Also available are hand micrometers having built-in electronic liquid crystal displays which show the workpiece thickness directly in digital numerals. Such devices are simpler for an operator to use by eliminating the need for the operator to perform any interpolation of the thickness reading. However, the numerals are generally quite small and, just as with the conventional barrel micrometer, the display is located on the micrometer frame and, therefore, not visible while the micrometer is in place to perform the thickness measurement of the strip. Hence, the uncertainty and operator dependency introduced by removing the micrometer from the strip so than it can be read is the same problem as for conventional barrel micrometers.

Due to increasingly stringent tolerance requirements generated by commercial demand, steel sheet and strip producers must now be capable of reliably rolling at aim gages that are below 25% of the traditional tolerance band. Precise and reliable set-up of the x-ray gagers is paramount to obtaining this goal, and conventional hand micrometers, either barrel or digital, are not capable of providing the extreme precision which is required for truly accurate, composition independent calibration of the x-ray gagers.

Another device for determining strip thickness is a contact gager such as that manufactured by the Vollmer Co. This contact gager includes opposed diamond tipped styluses which are spring loaded against opposite sides of the strip and are attached to LVDT transducers to generate an electrical signal which is proportional to the distance between the tips of the styluses. This signal is converted into a read-out of the strip thickness and is used to calibrate the x-ray gager. Contact gagers are accurate for fairly limited thickness ranges of strip, but suffer from several disadvantages. Such devices are bulky and must be mounted on the mill, i.e., cannot be used by hand; and linearity range is limited; and are complex to manufacture and, therefore, quite expensive.

An advantage exists, therefore, for a simple and accurate hand applied apparatus providing a high level of precision in determining strip thickness when using the comparator method of setting up the x-ray gager of a rolling mill. The apparatus should essentially eliminate the attendant sources of human error associated with conventional micrometers and should be capable of accurate thickness determinations for a wide range of strip thicknesses.

It is therefore an object of the present invention to provide a simple and accurate hand applied apparatus capable of obtaining a high level of precision in determining workpiece thickness.

It is a further object of the present invention to provide an apparatus which is essentially devoid of the sources of human error associated with the operation of conventional micrometers.

It is a further object of the invention to provide an apparatus which is capable of determining precise workpiece thickness readings for a wide range of workpiece thicknesses.

It is a yet a further object of the invention to provide a workpiece thickness measuring apparatus which is of simple construction, is easily operated by even the most unskilled of operators, and is of relatively low cost to manufacture.

Still other objects and advantages of the present invention will become apparent in light of the attached drawings and the written description of the invention presented herebelow.

SUMMARY OF THE INVENTION

In accordance with the present invention, a unique micrometer apparatus is provided which is capable of making strip workpiece thickness measurements with high precision and without operator dependence. The apparatus of the present invention is an improvement over known micrometers including a fixed anvil mounted to a "C" frame and a movable shaft mounted opposite the fixed anvil at a separation distance from the fixed anvil which represents the thickness of material therebetween. The fixed anvil of the present apparatus is held by the full weight of the apparatus solidly against the top surface of the essentially horizontal strip being measured. The apparatus further includes an indicator having a measuring head for carrying the movable shaft which contacts the bottom side of the strip opposite the fixed anvil, and a display head positioned atop the micrometer apparatus above the strip and facing the operator from which an indication of the strip thickness is easily read. The operator merely places the apparatus on the workpiece and the thickness measurement is performed and displayed automatically while the apparatus sits unattended on the workpiece.

DESCRIPTION OF THE PREFERRED EMBODIMENT

Figure 1:
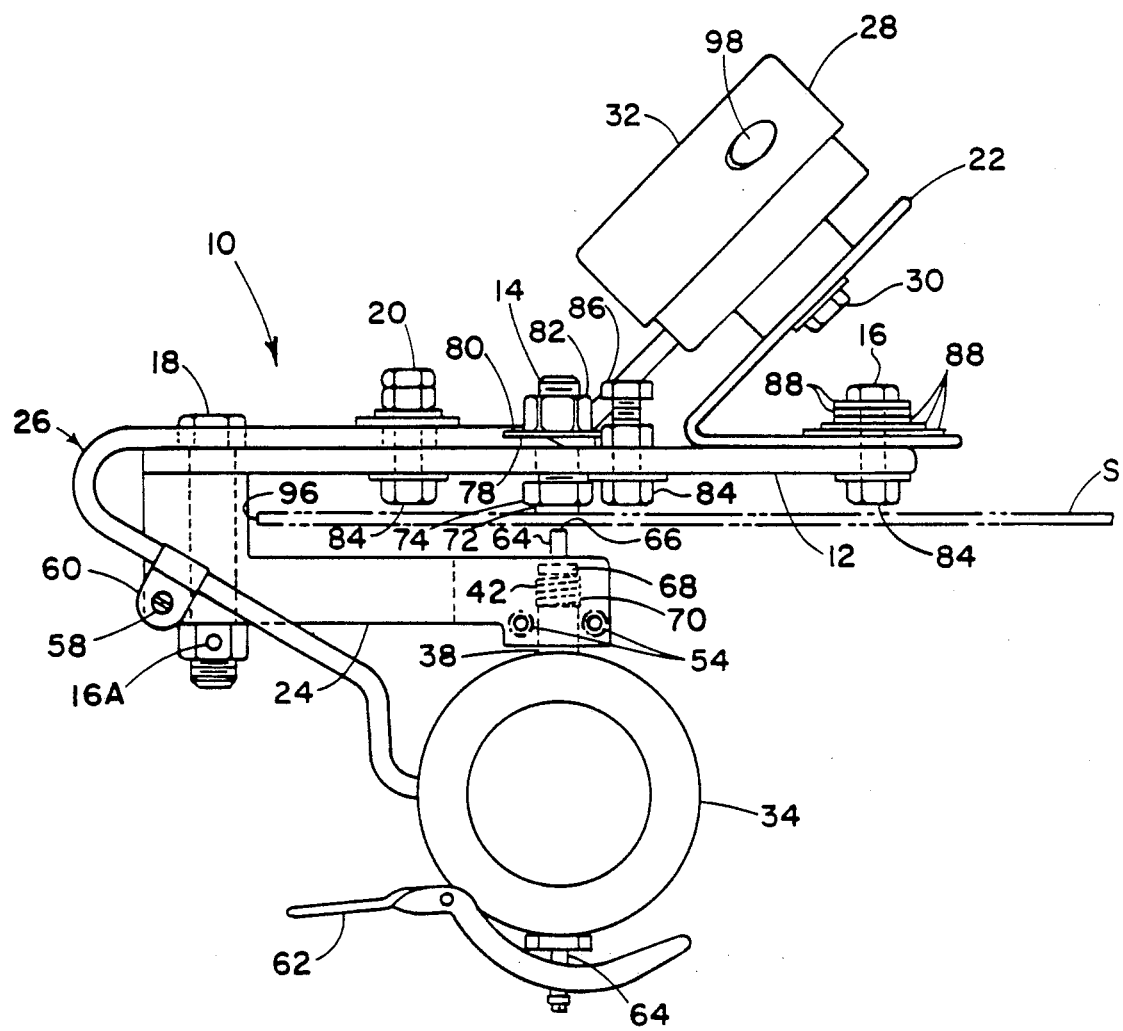
FIG. 1 is a side elevational view of the micrometer apparatus of the present invention.
Figure 2:
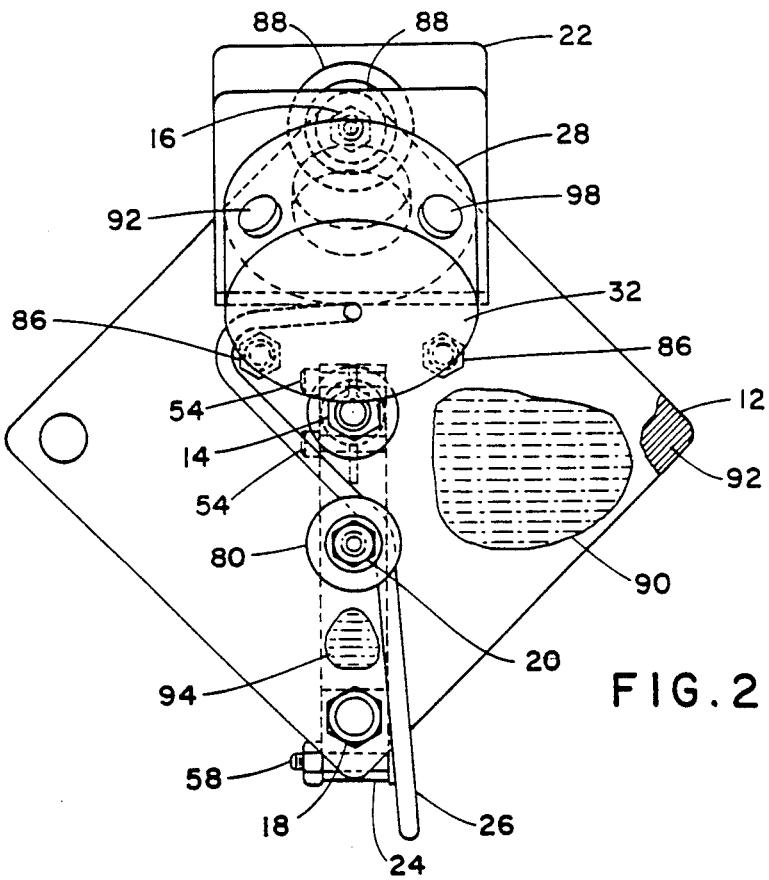
FIG. 2 is a plan view of the micrometer apparatus of the present invention.

FIGS. 1 and 2, illustrate side and plan views, respectively, of a micrometer apparatus 10 constructed in accordance with the present invention for measuring the thickness of a workpiece such as, for example, strip S. As used herein, the reference to sheet or strip workpieces should not be limited to metals, such as steel. Any sheet material with adequate rigidity, resulting from tension or thickness, to support the micrometer apparatus 10 can benefit from the improvements of the present invention.

Micrometer apparatus 10 includes a base plate 12 having a plurality of apertures therethrough for receiving anvil bolt 14, and fastening bolts 16, 18 and 20. Fastening bolts 16, 18 and 20 serve to fasten angled indicator display head holder 22, measuring head support arm 24, and measurement data transmission cable 26, respectively, to base plate 12. Angled indicator display head holder 22 is formed as an approximately 45° angled member and is supported atop base plate 12. Indicator display head 28 is attached to an upwardly inclined leg of holder 22 by fastener means 30. Display head 28 includes a display face 32 preferably bearing a liquid crystal display for indicating the thickness of strip S to 50 millionths of an inch (0.00005"). The display numerals in the liquid crystal display are preferably on the order of $\frac{1}{4}$" high and are therefore easily visible even at arm's length. Display face 32 may include other display means such as LED numerals, if desired. Display head 28 also preferably carries a battery (not shown) for powering the apparatus 10; however, the display head may be provided with electrical cables for connection to an AC power supply, if such is desirable.

Extending from display head 28 is the aforesaid measurement data transmission cable 26 which is connected at its opposite end to indicator measuring head 34. Measuring head 34, as will be appreciated from the following, serves to measure the thickness of strip S, in cooperation with anvil bolt 14, and transmits the strip thickness data through cable 26 to display head 28 where the data is numerically displayed on display face 32. Measuring head support arm 24, which carries measuring head 34, is fastened to a bottom side of base plate 12 by fastening bolt 18 (and cooperating fastening nut 16A). As is most clearly seen in FIGS. 1 and 4, measuring head support arm 24 is preferably an L-shaped member. Fastening bolt 18 passes through a bore 40 extending longitudinally through the shorter leg of L-shaped member 24.

In FIG. 1, projecting from a circumferential portion of measuring head 34 is a tubular member 38 which is grippingly received in a lower portion of a bore 42 provided in an end of the longer leg of the "L" opposite the shorter leg. As better shown in FIGS. 3 and 4, bore 42 extends parallel to bore 40. A slot 44 which begins at the end of the longer leg of the L-shaped member 24 closest to bore 42 passes diametrically through bore 42 in order to form opposed clamping means 46 and 48 for gripping tubular member 38. A pair of aligned bores 50 and 52 having threaded portions 50A and 52A, respectively, extend transversely through gripping means 46 and 48 with one of each of said pair of aligned bores being located on opposite sides of bore 42. Threaded fasteners 54 are received in bores 50 and 52 wherein their threads engage with threaded portions 50A and 52A to draw clamping means 46 and 48 into clamping engagement with tubular member 38. Such construction is advantageous in that it permits rapid and simple replacement and/or position adjustment of measuring head 34 during assembly.

Figure 3:
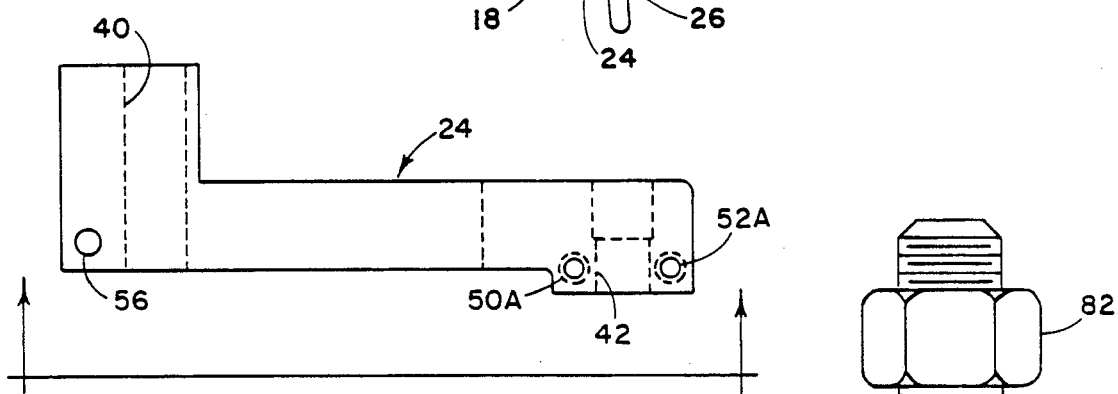
FIG. 3 is a side view of an indicator measuring head support arm of the present invention.
Figure 4:
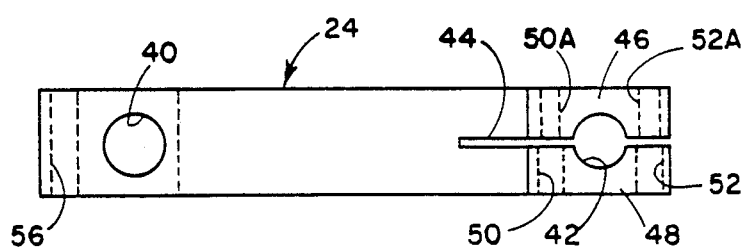
FIG. 4 is a view as seen in the direction of the arrows of FIG. 3.

Also shown in FIGS. 3 and 4, a third transverse bore 56 is provided in measuring head support arm 24 for receiving the clamping bolt 58 of a clamp 60 which holds cable 26 to arm 24 (FIG. 1).

With reference to FIG. 1, pivotally carried on a lower circumferential portion of measuring head 34 generally opposite to shaft 38 is a retractor lever 62. Lever 62 is used to retract a spring-biased, movable shaft 64 having an end face 66 which cooperates with a portion of anvil bolt 14, in a manner to be described below, to determine the thickness of a workpiece such as strip S. Shaft 64 passes essentially diametrically through measuring head 34, then through tubular member 38. A piston portion 68 of shaft 64 is received in a slightly enlarged upper portion of bore 42 and is maintained in a constant bias, preferably, by a compression spring internal to measuring head 34 so that end face 66 of shaft 64 is maintained in positive contact with the undersurface of strip S when the micrometer apparatus 10 is recording a thickness measurement. In the alternative a compression spring 70 may be located about shaft 38 within bore 42 to maintain the desired bias.

Figure 5:
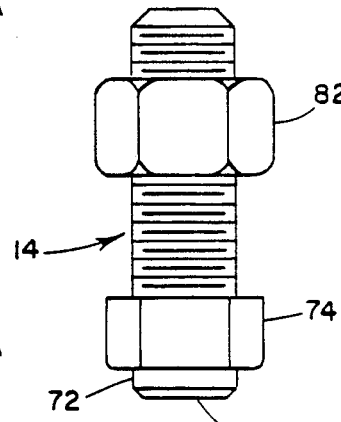
FIG. 5 is an enlarged view of the fixed anvil bolt of the present invention.

As aforementioned, the end face 66 of shaft 64 cooperates with a portion of anvil bolt 14 to determine the thickness of a workpiece such as strip S. In particular, anvil bolt 14 has a hard flat gage block means 72 attached to the outer surface of anvil bolt head 74. Gage block means 72 is preferably a hard material such as tungsten carbide, for example, which is known as "Jo Block" and which has an extremely flat, durable face 76 (FIG. 5) which contacts the upper surface of the workpiece at a position directly opposite to that where end face 66 of shaft 64 contacts the lower surface of the workpiece. The positioning of the wall anvil bolt 14 and movable shaft 64 is such that the face 76 of the gage block 72 is held in position on the upper surface of the workpiece by the full weight of the apparatus and the center of gravity of the apparatus passes through the fixed anvil 14 and movable shaft 64. It is the space or distance between gage block face 76 and end face 66 of shaft 64 which, during a workpiece measuring operation, is indicative of the thickness of the workpiece. Data bearing the workpiece thickness information is transmitted, as aforenoted, from measuring head 34 through cable 24 to display head 28 where it is displayed as a read-out on display face 32. Anvil bolt 14 is preferably fixed in position on base plate 12 by lock washer 78, standard washer 80, and nut 82 whereby its position may be adjustably, yet securely, fixed to base plate 12 for initial and subsequent calibration of the apparatus 10.

A unique advantage provided by the micrometer apparatus of the present invention is that during operation, the entire weight of the micrometer apparatus is balanced upon and supported solely by the gage block face 76 of the fixed anvil bolt 14 to thereby provide stable contact of the apparatus 10 with the strip workpiece, without human intervention. An additional advantage is the ability to use the micrometer apparatus 10 through several degrees of tilt of the otherwise basically horizontal strip S such as between the roll bite and the billy roll. Typically the strip S may generally vary by an angle of a few degrees from the horizontal from mill to mill. Furthermore, the apparatus makes its thickness measurement automatically while statically balanced on face 76. Thus, micrometer apparatus 10 is operator independent and the errors associated with human involvement in operating the micrometer apparatus are eliminated by its novel construction and method of operation.

Using gravity to solidly hold the gage block face 76 of the fixed anvil bolt 14 against the top surface of the strip avoids the requirement for two measuring heads on opposite sides of the strip and eliminates the attendant mounting complications and potential for doubled instrument imprecision associated with providing a second measuring head. Moreover, the internal design of the measuring head 34 and display head 28 unit of the present invention does not involve LVDTs. Consequently, the linearity, accuracy and range of the micrometer apparatus 10 of the present invention are not limited as they are in the aforementioned LVDT-operated contact gagers, for example.

As used in the described embodiment, measuring head 34 and display head 28 are commercially available equipment, typically assembled as a single unit. In accordance with the present invention, head 34 and head 28 were arranged as shown in FIG. 1 so that the measuring head 34 performs its function below the strip workpiece S and display head 28 is visible above the strip S while the device 10 is free-standing on the top surface of strip S. Furthermore, although such commercial units typically can measure up to one (1) inch (2.54 cm) in thickness with precision up to 0.00005 inch, such units still have the disadvantages previously described. For the preferred embodiment of FIG. 1, the shaft 64 was designed for a linear stroke of one-half ($\frac{1}{2}$) inch (1.27 cm) by retraction of end face 66 of shaft 64 into the measuring head holder 24 during placement of device 10 onto a strip S.

A plastic nut 84 is provided on the lower end each of fastening bolts 16 and 20 as well as on the lower ends of protector bolts 86 below base plate 12. The plastic nuts prevent damage to both the workpiece and the fixed anvil bolt 14, particularly gage block 72 and face 76, during placement and removal of apparatus 10 from the workpiece. The depth of the lowermost surface of plastic nuts 84 below base plate 12 may be approximately 1/6" less than that of the end face 76 of gage block 72 so that in the "settled" measuring position, the "bumper" nuts 84 do not interfere with the operation of the apparatus.

The fastening bolt 16 of the micrometer apparatus 10 is with one or more weights 88 of various sizes which may be added and/or removed from the instrument, as necessary, in order to appropriately counterweight the apparatus such that its center of gravity passes perpendicularly through the center of gage block face 76.

As shown in the Figures, the distance separating anvil bolt 14 and fastening bolt 18, which is essentially the length of long leg of support arm 24, is what determines the "throat" depth of micrometer apparatus 10. In turn, the throat depth determines the extent that the apparatus 10 fits over the edge 96 of strip S. The throat depth is not critical nor an absolute and is determined by the requirements of the applications and weight balance consideration of the apparatus. In other words, the center of gravity of the micrometer apparatus 10, which passes through anvil bolt 14, essentially determines the length of the long leg of the support arm 24 and, therefore, the throat depth of the apparatus. The preferred embodiment of the present invention had a throat depth of about three (3) inches (7.62 cm).

The operation of the "hands-off" micrometer apparatus 10 of the present invention is as follows:

An operator grasps the base plate by either the right or left hand corner to zero its measuring apparatus before it is placed on the workpiece. As shown, and described, the apparatus is gripped by the left hand and operated by the right hand. Such corner may be provided with a positive-grip surfacing 92 (FIG. 2) and use instructions 90, if desired. The operator then switches the apparatus on via a switch (not shown) and clears the display head 28 by pressing "CLEAR" button 92 if the display does not read "zero". The operator then grasps the base plate 12 and measuring head support arm 24 in the left hand while placing the thumb of the left hand on spot 94 (FIG. 2) which may also be provided with a positive-grip surfacing. Then by reaching under apparatus 10 with the right hand, the operator fully retracts spring loaded measuring shaft 64 with the pivotable retractor lever 62. Fully retracting shaft 64 brings tip 66 into the recess of bore 42 so that it is protected while placing the unit on the work piece. The operator then slides the apparatus onto the strip angling it slightly downwardly and forwardly so that the plastic bumper nut 84 on fastening nut 16 is in contact with the strip S. Edge 96 should be placed adjacent but not in contact with the vertically extending leg of arm 24. For example, when the edge 96 (FIG. 1) of strip S contacts the inside of the vertically-extending shorter leg of measuring head support arm 24, the apparatus is backed off approximately ⅛ inch (0.32 cm). The operator then gently releases the retractor lever 62 so that the end face 66 of measuring shaft 64 can press against the bottom side of the strip and subsequently releases the left-hand grip from the base plate 12. The operator then gently taps the base plate to assure proper "settling" under the influence of gravity into stabilized contact of gage block face 76 and the top of the workpiece. The apparatus then automatically measures the strip thickness with the numerical value depicted on the display face representing the strip thickness to 50 millionths of an inch (0.00005"). The operator then gently depresses the "HOLD" button 98 on the display head 28 in order to retain the thickness value displayed on the display face 32. Due to the stability provided by flat face 76 of gage block 72, the "HOLD" button may be depressed without affecting the accuracy of the thickness reading.

Once the thickness value is retained, the operator regrips the apparatus as before with the left hand, retracts lever 62 with the right hand, and removes the apparatus from the strip by sliding it away from edge 96.

If the apparatus is used to set the nominal value of an x-ray gager, the apparatus can be carried to the x-ray gager panel having the nominal thickness setting switches and the numerical value held on the display face 32 can be manually entered into the x-ray gager in order to accurately standardize the same. The apparatus 10 also may be wired directly from the display head 28 to the x-ray gager or a printer or other equipment.

The "hands-off" micrometer apparatus of the present invention has been subjected to repeatability and reproducibility studies to determine its capacity for consistently obtaining precise workpiece "aim" gage readings that lie within a relatively small fraction, preferably less than 25%, of a prescribed commercial tolerance band. In a first such study, the apparatus was tested by three separate operators each performing two separate trials on ten test strip samples ranging from 0.052" to 0.072" gage and having a commercial tolerance 0.006" and produced a total system measurement variation due to repeatability and reproducibility of 0.00040", or approximately 7% of the full commercial tolerance band. In a second such study, the apparatus was tested by three operators performing two separate trials on ten test strip samples ranging from 0.053" to 0.062" gage and having a commercial tolerance of 0.006" and produced a total system measurement variation due to repeatability and reproducibility of 0.00059", or approximately 10% of the full commercial tolerance band.

As one will readily appreciate, such a precise instrument represents a vast improvement over the capabilities of conventional micrometers in determining the actual gages of sheet and strip material, particularly, steel strip and is fully capable of reliably determining strip thicknesses to increasingly stringent tolerance bands demanded by the industry that fall within relatively small fractions of the traditional tolerance bands. Consequently, by virtue of its accuracy, the "hands-off" micrometer permits a steel producer to reliably and accurately roll strip to thicknesses virtually precisely at the target gages required by its customers.

Although the present invention is described as being useful for rolling mills practices, it should be understood that the micrometer apparatus 10 is also useful for any stationary or extremely slow moving sheet or strip material having sufficient rigidity to support the apparatus. It has also been found through experience that outfitting the measuring site with a counterweight to reduce the effective weight of the apparatus 10 will permit use on lighter gage materials.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. A portable apparatus for automatically measuring and displaying a workpiece thickness without operator intervention, said apparatus comprising:
   a base plate for positioning above an upper surface of a workpiece during operation of said apparatus;
   means carried by said base plate for contacting said upper surface such that the center of gravity of said apparatus passes through said means for contacting said upper surface, said apparatus being supported and balanced on said upper surface solely by said means for contacting during operation of said apparatus;
   means carried by said situated below said base plate for automatically measuring said workpiece thickness, said means for automatically measuring being positioned below a lower surface of said workpiece during operation of said apparatus; and
   means carried by and situated above said base plate for automatically displaying the workpiece thickness measured by said means for measuring said means for automatically displaying providing a prominent and readily visible display, while said apparatus is positioned on and borne solely by said workpiece, of a value representing the workpiece thickness measured by said means for measuring.

2. The apparatus of claim 1 wherein said means for contacting comprises an anvil protruding below a lower surface of said base plate.

3. The apparatus of claim 2 wherein said anvil comprises an adjustable bolt having a head portion situated below the lower surface of said base plate.

4. The apparatus of claim 3 wherein said anvil further comprises a gage block attached to an outer surface of said bolt head portion, said gage block having a lat face which contacts the upper surface of said workpiece during operation of said apparatus.

5. The apparatus of claim 4 wherein said means for measuring comprises a measuring head including a movable spring-biased shaft, said shaft having an end face which is biased into contact with the lower surface of said workpiece at a location directly opposite the face of the gage block during operation of said apparatus.

6. The apparatus of claim 4 further comprising means for counterweighting said apparatus such that the center of gravity of said apparatus passes perpendicularly through the center of the face of the gage block.

7. The apparatus of claim 1 wherein said means for automatically displaying comprise a display head including means for retaining the displayed workpiece thickness value.

8. The apparatus for claim 1 wherein said means for automatically displaying displays workpiece thickness values to 50 millionths of an inch.

9. A portable apparatus for automatically measuring and displaying a workpiece thickness without operator intervention, said apparatus comprising:
 a base plate for positioning above an upper surface of a workpiece driving operation of said apparatus:
 an anvil bolt carried by said base plate, said anvil bolt including a head portion having a gage block attached to an outer surface thereof, said gage block having a face for contacting the upper surface of said workpiece, said apparatus being supported and balanced upon the upper surface for the workpiece solely by said face during operation of said apparatus such that the center of gravity of said apparatus passes through said face;
 a measuring head carried by and situated below said base plate for automatically measuring said workpiece thickness, said measuring head being situated below a lower surface of said workpiece during operation of said apparatus, said measuring head including a movable spring-biased shaft, said shaft having an end face which is biased into contact with the lower surface of said workpiece at a location directly opposite the race of the gage block during operation of said apparatus;
 a display head carried by and situated above said base plate for automatically displaying the workpiece thickness measured by said measuring head, said measuring head providing a prominent and readily visible display, while said apparatus is positioned on and borne solely by said workpiece, of a value representing the workpiece thickness measured by said measuring head.

10. A method for measuring the thickness of a workpiece using a portable automatic measuring apparatus having a base plate, an automatic measuring head situated below the base plate and an automatic display head situated above the base plate, said method comprising:
 (a) retracting a spring-biased measuring shaft of said measuring head;
 (b) placing the base plate in a position above a workpiece such that an anvil carried by said base plate contacts an upper surface of said workpiece;
 (c) balancing the entire weight of the apparatus on said anvil;
 (d) releasing the spring-biased shaft to permit an end of the shaft to contact a lower surface of the workpiece;
 (e) releasing the apparatus;
 (f) obtaining a numerical value displayed by said display head, said numerical value representing the thickness of said workpiece measured by said measuring head; and
 (g) retracting the spring-biased shaft, and removing the apparatus form the workpiece.

11. The method of claim 10 further comprising, following step (f) and prior to step (g), the step of:
 retaining the numerical value displayed by said display head.

12. The method of claim 11 further comprising, following step (g), the step of:
 transmitting to an x-ray gager the numerical value retained by said display head in order to standardize the x-ray gager.

* * * * *